United States Patent [19]

Maida

[11] Patent Number: 4,468,109

[45] Date of Patent: Aug. 28, 1984

[54] CAMERA WITH AUTOMATIC EXPOSURE CONTROL AND DISPLAY DEVICE

[75] Inventor: Osamu Maida, Tokyo, Japan

[73] Assignee: Nippon Kogaku K.K., Tokyo, Japan

[21] Appl. No.: 438,311

[22] Filed: Nov. 1, 1982

[30] Foreign Application Priority Data

Nov. 6, 1981 [JP] Japan .............................. 56-178097

[51] Int. Cl.$^3$ ............................................... G03B 7/08
[52] U.S. Cl. .................................... 354/442; 354/474
[58] Field of Search ................... 354/36, 38, 471, 474, 354/289.1, 442

[56] References Cited

U.S. PATENT DOCUMENTS

| | | | |
|---|---|---|---|
| 3,871,005 | 3/1975 | Uchida et al. | 354/38 |
| 3,964,073 | 6/1976 | Kobori et al. | 354/38 |
| 4,175,842 | 11/1979 | Sakurada et al. | 354/38 |
| 4,196,989 | 4/1980 | Toyoda et al. | 354/38 |
| 4,204,755 | 5/1980 | Toyoda et al. | 354/36 |
| 4,312,579 | 1/1982 | Araki | 354/38 |
| 4,358,188 | 11/1982 | Uchidoi et al. | 354/38 |
| 4,385,819 | 5/1983 | Toyoda et al. | 354/36 |

*Primary Examiner*—Russell E. Adams
*Attorney, Agent, or Firm*—Shapiro and Shapiro

[57] ABSTRACT

An automatic exposure control camera, with a plurality of selectable control modes, has a display device that normally display an exposure value determined by the control mode and by operating conditions of the automatic exposure control. The user may cause the display device to display a different exposure value, which again depends upon the control mode and the operating conditions of the automatic exposure control. A further display device displays the selected mode and also indicates, as by the blinking of an indicator element, when certain limits of exposure time value or aperture value have been reached (with appropriate modification of the exposure control operation). In one control mode, the automatic exposure control is reprogrammed in association with the selection of shutter speeds.

7 Claims, 8 Drawing Figures

FIG. 6B

CAMERA WITH AUTOMATIC EXPOSURE CONTROL AND DISPLAY DEVICE

BACKGROUND OF THE INVENTION

1. Field of the Invention

The present invention relates to an exposure control device for a camera, particularly with an electric control circuit for automatic exposure control, and more specifically to an exposure control device capable of programmed automatic exposure for automatically controlling both exposure time and diaphragm aperture according to a predetermined program.

2. Description of the Prior Art

There are known programmed exposure control devices capable of detecting an exposure value (EV), prior to the photographing operation, from the information on luminance of the object obtained from a light metering device, determining a combination of the time value (TV) and the aperture value (AV) from thus detected exposure value and an ASA speed value (SV) according to a predermined program, and automatically controlling a shutter mechanism and a diaphragm mechanism from thus determined combination. A programmed exposure control device disclosed in the U.S. Pat. No. 4,204,755 performs a programmed exposure control for the luminance value within a determined range in which the time value and the aperture value are changed at a determined rate, but changes the time value alone while fixing the aperture value at a limit value for a very large or very small luminance value outside the limits of control range for the aperture value.

For photographing purposes with appropriate exposures, such conventional device allows expansion of the photographable range of luminance value by changing the time value even when the aperture value reaches a limit.

The above-mentioned reference also discloses a display device for thus controlled exposure, but such display device only displays the shutter speed not the diaphragm aperture. On the other hand a conventional camera capable of displaying both the shutter speed and the diaphragm aperture requires independent display devices for such displays. A display device composed of light-emitting diodes consumes significant electric power for display, thus reducing the service life of the battery. On the other hand, a display device composed of liquid crystal elements is not associated with such drawback in the power consumption. Such liquid crystal display should preferably be used in the static drive mode in consideration of the display on the camera in a low temperature condition, but such mode for two displays for the diaphragm aperture and the shutter speed requires increased wiring which cannot be easily accommodated in small equipment such as a camera. In addition the use of two display devices leads to increased cost for the driving circuits as well as for the display devices themselves.

SUMMARY OF THE INVENTION

An object of the present invention is to provide a programmed exposure control device allowing photograph taking with appropriate exposure for objects in a wider range of luminance value.

For achieving the above-mentioned object, the device of the present invention comprises means for correcting, if the controlled aperture value is within the control range when the controlled shutter speed reaches a control limit, said aperture value so as to obtain an appropriate exposure in combination with the shutter speed at said limit.

Another object of the present invention is to provide a display device capable of selectively indicating the shutter speed and the aperture value according to the discretion of the operator.

For achieving the above-mentioned object, the display device of the present invention is capable of displaying the aperture value as the main display data and the shutter speed as the subsidiary display data selectively on a display unit in the shutter-speed priority automatic exposure control mode, and is capable of displaying the shutter speed as the main display data and the aperture value as the subsidiary display data in the programmed automatic exposure control mode and in the aperture priority automatic exposure control mode.

DESCRIPTION OF THE PREFERRED EMBODIMENTS

Now the present invention will be clarified in detail by description of a preferred embodiment thereof.

Figure 1:
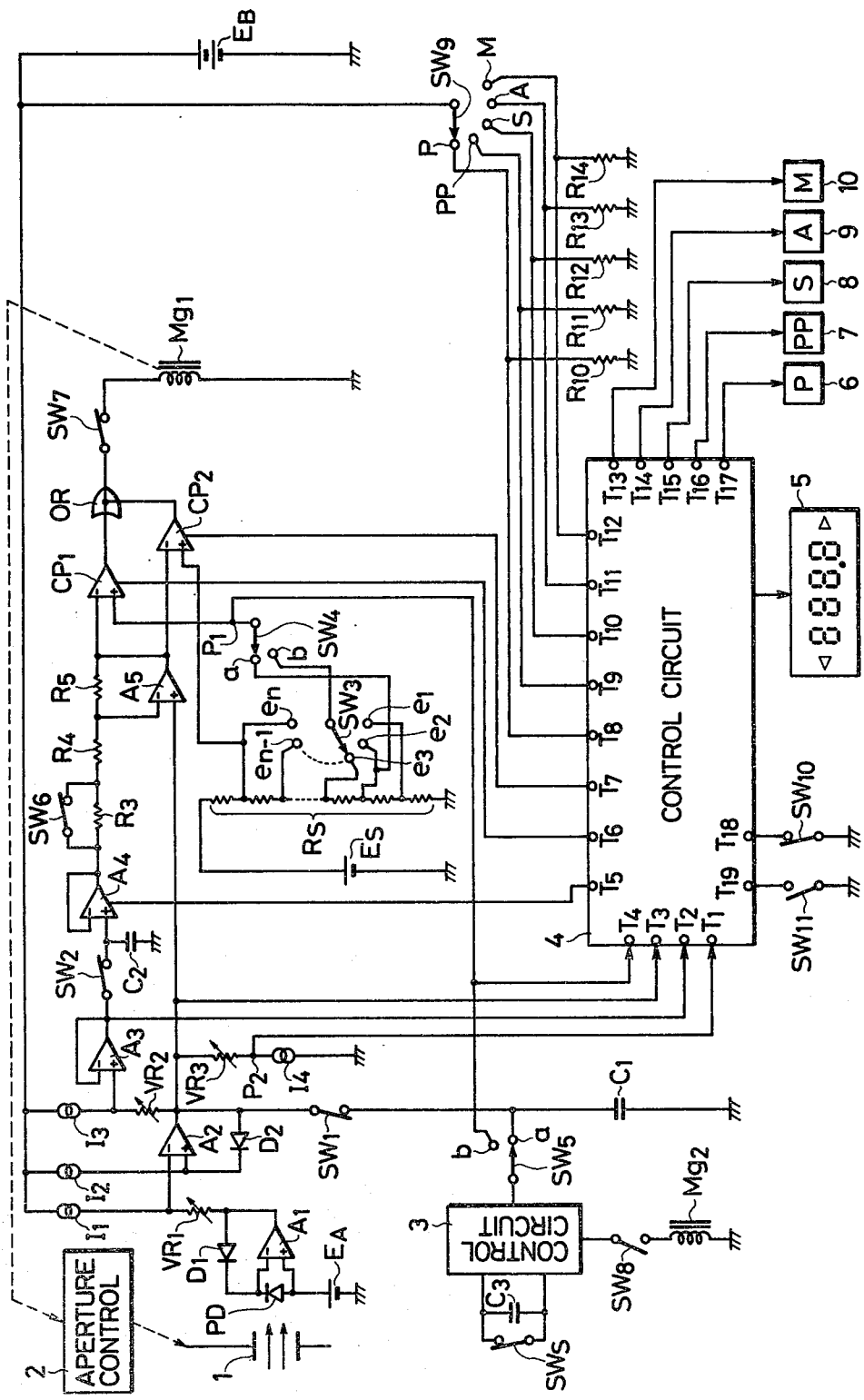
FIG. 1 is a circuit diagram of an exposure control device embodying the present invention.

FIG. 1 is a circuit diagram showing an embodiment of the present invention, wherein the aperture of a diaphragm 1 of a photographic lens is controlled by an aperture control mechanism 2. A photodiode PD, an operational amplifier A1 and a logarithmic compression diode D1 constitutes a light metering circuit, and the positive input terminal of said operational amplifier A1 is biased by a voltage proportional to the absolute temperature of a reference voltage source EA. The resistance of a variable resistor VR1 corresponds to the film sensitivity or film speed selected by a dial (not shown) for setting the film speed. A constant current source I1 supplies the variable resistor VR1 with a current proportional to the absolute temperature. An operational amplifier A2, a temperature-compensating diode D2 and a constant current source I2 supplying a temperature-independent current are provided to dissipate the temperature dependence of the inverse saturated current of the logarithmic compression diode D1. The output voltage of the operational amplifier A2 is supplied to a first memory condenser C1 through a first memory switch SW1, which, being linked for example with the quick-returning mirror of the camera, remains closed while the light from the object enters the photodiode PD in normal manner and is turned off immediately before said light is intercepted.

The resistance of the variable resistor VR2 corresponds to the maximum diaphragm aperture of the photographic lens, and is adjusted for different maximum apertures in case the camera has different interchangeable lenses. A constant current source I3 supplies the variable resistor VR2 with a current proportional to the absolute temperature, so that the positive input terminal of a follower amplifier A3 receives the sum of the output voltage of the operational amplifier A2 and a voltage corresponding to the maximum diaphragm aperture. The output voltage of the follower amplifier A3 is supplied to a second memory condenser C2 through a second memory switch SW2 to be turned off in response to the shutter releasing operation, and the voltage of said second memory condenser C2 is outputted from a follower amplifier A4 after impedance conversion.

Resistors R3, R4, R5 and an operational amplifier A5 constitute a same-phase amplifier, in which said operational amplifier A5 provides an output voltage of the same phase as that of the operational amplifier A2 wherein the output voltage of the follower amplifier A4 is used as a reference voltage, and the resistors R3, R4, R5 determine the rate of amplification. A switch SW6 is provided to connect the resistor R3 between the follower amplifier A4 and the resistor R4. A shutter speed selecting switch SW3 is linked with a shutter dial of the camera and is selectively connected to one of plural contacts e1-en provided in a resistor ladder Rs powered from a power source Es. The voltage selected by said switch SW3 is supplied to a contact b of a switch SW4 while the voltage at the contact e2 is constantly supplied to a contact a of said switch SW4, which therefore supplies a junction P1 with the voltage of either of said contacts a, b.

When the output voltage of the operational amplifier A5 and the voltage at said junction P1 arrive at a determined relation, a comparator CP1 energizes an aperture control magnet Mg1 through a wired OR gate. Also when the output voltage of the operational amplifier A5 and the voltage of a contact en corresponding to the selected shutter speed arrive at a determined relation, a comparator CP2 energizes the above-mentioned magnet Mg1 through the wired OR gate.

The switch SW4 is connected to its contact a in the programmed automatic exposure control mode and to its contact b in the programmable program mode, shutter-speed priority automatic exposure control mode and manual exposure mode, but may be connected to either contact in the aperture priority automatic exposure control mode. The switch SW5 is connected to its contact a in the programmed automatic exposure control mode, programmable program automatic exposure control mode, shutter-speed priority automatic exposure control mode and aperture priority automatic exposure control mode, and to its contact b in the manual exposure mode.

A control circuit 3 determines the shutter speed according to the voltage at the contact a or b of the switch SW5 when the first memory switch SW1 is turned off after the diaphragm 1 is fixed at a determined aperture. More specifically, a switch SWs is turned off in response to the start of an aperture opening curtain of shutter to initiate the integration by an integrating condenser C3, and a shutter control magnet Mg2 is energized through a shutter control switch SW8 when the integrated voltage reaches a determined relation with the voltage at the contact a or b of the switch SW5, whereby a closing curtain of the shutter is released to terminate the exposure operation. The shutter speed determining circuit consisting of the control circuit 3, condenser C3 etc. may be composed of known analog circuitry or digital circuitry. The shutter control switch SW8 is turned on and off at approximately inverse timings with the first memory switch SW1 and energizes the magnet MG2 only when the shutter curtains are controlled. An aperture control switch SW7 remains closed from the opening of the second memory switch SW2 until the closing of the shutter control switch SW5, and remains opened from the closing of the switch SW8 until the opening of the switch SW2. A serial circuit of a variable resistor VR3 and a constant current input source I4 is connected to the output terminal of the operational amplifier A2. Said variable resistor VR3 is linked with a preset aperture ring of the lens and changes the resistance in proportion to the difference in number of stops between the fully open aperture of the lens and the preset aperture value. The constant current source I4 supplies the variable resistor VR3 with a current proportional to the absolute temperature. The voltage at a juntion P2 corresponds to the output voltage of the operational amplifier A2 minus the voltage across the variable resistor VR3. A switch SW9 is connected to a contact P in the programmed automatic exposure control mode, a contact PP in the programmable program automatic exposure control mode, a contact S in the shutter speed priority automatic exposure control mode, a contact A in the aperture priority automatic exposure control mode, and a contact M in the manual exposure mode. A latch switch SW10 is turned off when the second memory switch SW2 is turned off and is turned on when the first memory switch SW1 is turned on after the completion of the exposure to latch the display on a display unit 5. A display selector switch SW11 is linked with a display selector (not shown) provided on the camera body, and is normally opened but is closed as long as said display selector is pressed with a finger for switching the display. A control circuit 4 is provided with input ports T1–T4 for entering exposure factors, input ports T8–T12 for entering display mode control signals, output ports T5–T7 for outputting logic signals for respectively controlling the follower amplifier A4, comparator CP1 and comparator CP2, and output ports T13–T17 respectively connected to mode display units 6–10. The digital display unit 5 composed of four 7-segment display elements and additional display elements displays exposure factor etc. in response to signals transmitted from the control circuit 4.

Now there will be given an explanation of the function of the above-described circuit, wherein the exposure factors such as the aperture value and time value are represented by apex values D which are related to signal voltages V through a relation $V = E1 + \alpha D$, where E1 is a constant voltage independent from the apex value and $\alpha$ is a coefficient for converting the apex value into the voltage. As such voltage V corresponds to the apex value of this manner, a relation $V = D$ is assumed for the purpose of simplicity in the following explanation. Also it is assumed that the photographic lens has a fully open aperture of $AV = 1$, namely $F = 1.4$

[1] Programmed automatic exposure control mode

In this mode the switches SW4, SW5 are connected to their contact a, and the switch SW6 is closed. It is assumed that the preset aperture ring of the photographic lens is set at F16 ($AV = 8$), so that the maximum aperture value $AV_M$ corresponding to the smallest aperture is $AV_M = 8$.

Also for the convenience of explanation it is assumed that the output ports T5, T6 of the control circuit 4 output high (H) level signals to enable the function of the operational amplifier A4 and the comparator CP1 while the output port T7 output a low (L) signal to disable the function of the comparator CP2.

AS the diaphragm 1 of the lens is fully opened before the shutter is released, the operational amplifier A2 provides an output voltage:

$$VA2=(BV-AV_0)+SV \qquad (1)$$

wherein $AV_0$ is the aperture value of the lens at this state, BV is the luminance value, and SV is the ASA speed value of the photographic film. Consequently the follower amplifier A3 provides an output voltage:

$$VA3=BV+SV \qquad (2)$$

corresponding to the exposure value $EV=BV+SV$. Before the shutter release, the voltage across the second memory condenser C2 and the output voltage VA4 of the follower amplifier A4 are equal to said voltage VA3. The operational amplifier A5 provides an output voltage:

$$VA5=(1+\eta)VA2-\eta VA4 \qquad (3)$$

wherein $\eta=R5/R4$. On the other hand, the voltage $V_{TVMe2}$ at the junction P1 has a relation:

$$V_{TVMe2}=TV_{Me2} \qquad (4)$$

wherein $TV_{Me2}$ represents the shutter speed corresponding to the voltage at a contact e2.

In response to a shutter releasing operation in such state, the second memory switch SW2 is turned off whereby the voltage shown by the equation (2) is stored in the second memory condenser C2 and is outputted from the follower amplifier A4. The following sequence for controlling the aperture is effected according to one of four modes depending on the mutual relation of $AV_P$, $AV_0$ and $AV_M$, and on the mutual relation of $TV_P$ and $TV_{MAX}$, wherein $AV_P$ is an aperture value to be attained under control, $AV_M$ is the maximum aperture value corresponding to the smallest aperture determined by the preset aperture ring, $TV_P$ is a shutter speed to be attained under control, and $TV_{MAX}$ is the upper limit of the shutter speed.

(i) $AV_0<AV_P<AV_M$ and $TV_P \leq TV_{MAX}$:

Under this condition, the diameter of the diaphragm 1 is reduced to provide the following output voltage from the operational amplifier A2:

$$VA2=(BV-AV')+SV \qquad (5)$$

wherein $AV'$ represents a transient aperture value during such diaphragm closing operation, so that the operational amplifier A5 provides an output voltage:

$$VA5=(1+\eta)(BV-AV'+SV)-\eta(BV+SV) \qquad (6).$$

When the output voltage VA5 from the operational amplifier A5 becomes equal to the voltage $V_{TVMe2}$ at the junction P1, the comparator CP1 outputs an H-level signal to energize the magnet Mg1, thereby terminating said diaphragm closing operation at an aperture value $AV_P$, which can therefore be represented in the following manner from the equations (2) and (6):

$$AV_P = \frac{1}{1+\eta}(BV+SV-TV_{Me2}) \qquad (7)$$

Upon completion of the aperture control operation, the first memory switch SW1 is opened to store, in the first memory condenser, the output voltage of the operational amplifier A2 represented by:

$$VA2=BV-AV_P+SV \qquad (8)$$

Since $BV+SV=TV+AV$ in the apex representation, the shutter speed $TV_P$ attained by the shutter speed determining circuit is represented as follows from the equations (7) and (8):

$$TV_P = \frac{\eta}{1+\eta}(BV+SV+TV_{Me2}) \qquad (9)$$

Figure 2:
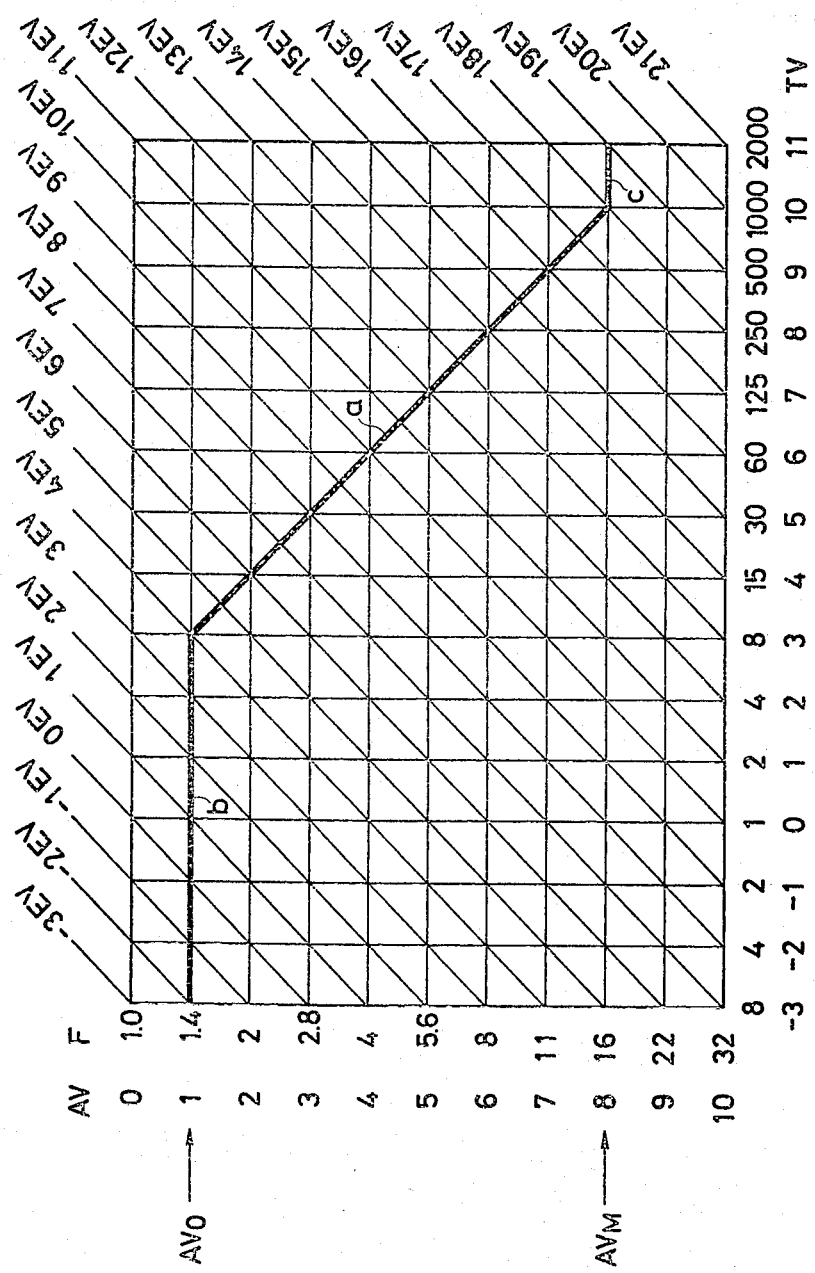
FIGS. 2, 3, 4 and 5 are charts showing the programs of the time value and the aperture value achievable by the device shown in FIG. 1.

A line (a) in FIG. 2 shows the relationship between $AV_P$ and $TV_P$ for $\eta/(1+\eta)=0.5$. Thus, in an EV range from 4 to 18, the aperture value is defined by $AV_P=0.5(EV-TV_{Me2})$ while the shutter speed is defined by $TV_P=0.5(EV+TV_{Me2})$, wherein $\eta/(1+\eta)=0.5$ defines the inclination of the line (a) while $TV_{Me2}=2$ determines the shutter speed at the crossing point of said line (a) and a line for $EV=0$.

(ii) $AV_P<AV_0$ and $TV_P \leq TV_{MAX}$:

This condition signifies a state in which an appropriate exposure can only be obtained at an aperture of the diaphragm 1 larger than the fully open aperture ($EV<4$) according to said line (a). However the diaphragm 1 is naturally limited to the fully open aperture, so that $AV_P$ and $TV_P$ are controlled according to a line (b) in FIG. 2.

At the fully open aperture, the operational amplifier A5 provides the output voltage $VA5=(1+\eta)(BV-AV_0+SV)-\eta(BV+SV)$ while the junction P1 has the voltage represented by the equation (4), so that a relation $VA5<V_{TVMe2}$ stands before the start of aperture control. Consequently, in response to the shutter releasing operation, the magnet Mg1 is energized to maintain the diaphragm 1 at the maximum aperture.

Subsequently the first memory switch SW1 is turned off to store, in the first memory condenser C1, the output voltage VA2 of the operational amplifier A2 represented by the equation (1). The shutter speed determining circuit determines the following shutter speed according to said voltage:

$$TV_{A0}=BV-AV_0+SV \qquad (10)$$

In this manner the aperture value and the shutter speed are so controlled as to satisfy relations $AV_P=AV_0$, $TV_P=BV-AV_0+SV=TV_{A0}$.

(iii) $AV_M<AV_P$, $TV_P \leq TV_{MAX}$:

This condition corresponds to a state in which the relation $VA5>V_{TVMe2}$ is maintained even when the diaphragm 1 is reduced to the smallest aperture. Since the diameter of the diaphragm cannot be reduced beyond a diameter corresponding to the aperture value $AV_M$ determined by the preset aperture ring, $AV_P$ and $TV_P$ are controlled according to a line (c) in FIG. 2. Such control takes place when $EV>18$.

At the completion of the aperture control the operational amplifier AV2 provides an output voltage:

$$VA2=(BV-AV_M+SV) \qquad (11)$$

so that the shutter speed determining circuit determines a shutter speed:

$$TV_{AM} = BV - AV_M + SV \quad (12)$$

In this manner the aperture value and the shutter speed are so controlled as to satisfy relations $AV_P = AV_M$ and $TV_P = BV - AV_M + SV = TV_{AM}$.

Figure 3:
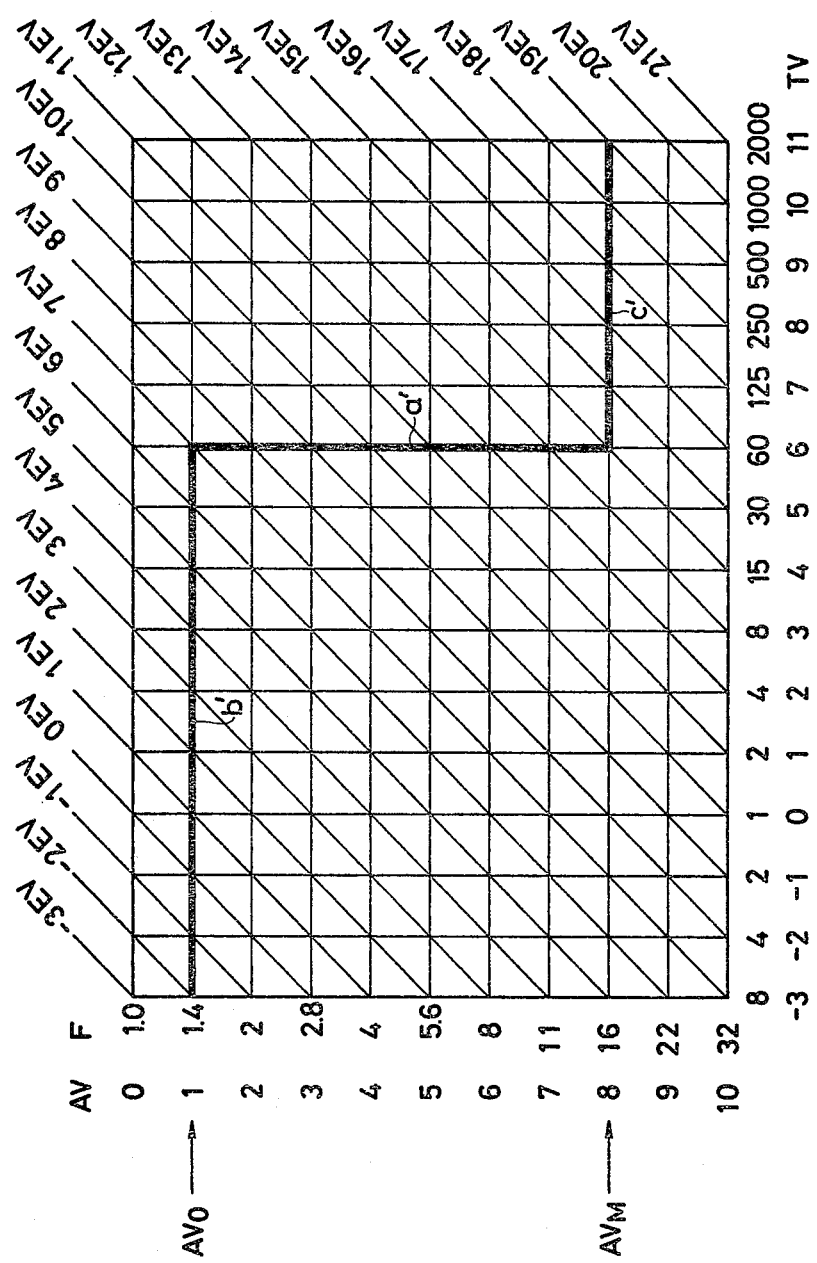

In the foregoing is explained the exposure control operation for a condition of $\eta/(1+\eta) = 0.5$. On the other hand, for a condition $\eta/(1+\eta) = 0$ ($\eta = 0$) and $TV_{Me2} = 6$, the exposure is controlled as shown in FIG. 3. In such situation, and under a condition $AV_0 < AV_P < AV_M$, the shutter speed $TV_{Me2}$ is fixed as is clear from the equations (8) and (9) and the aperture value $AV_P$ alone is adjusted to provide the appropriate exposure as represented by a line (a') in FIG. 3. Under a condition $AV_P < AV_0$, the aperture value is fixed at $AV_P = AV_0$ and the shutter speed alone is controlled according to a relation $TV_{PA0} = BV - AV_0 + SV$ as represented by a line (b'). Also under a condition $AV_M < AV_P$, the aperture value is fixed at $AV_P = AV_M$, and the shutter speed alone is controlled according to a relation $TV_{PAM} = BV - AV_M + SV$ as represented by a line (c').

By opening the switch SW6 a relation $\eta = R5/(R3 + R4)$ is obtained to modify the inclination of the line (a) in FIG. 2. In this manner it is possible to modify the combination of the aperture value $AV_P$ and the shutter speed $TV_P$ for a given EV value.

(iv) $AV_M < AV_P$, $TV_P \geq TV_{MAX}$ ($TV_{MAX}$ is the maximum shutter speed controllable by the shutter speed determining circuit):

Since the shutter speed determining circuit has a maximum controllable shutter speed, an appropriate exposure cannot be obtained if the shutter speed $TV_P$ exceeds said maximum value. Under this condition, an appropriate exposure is obtained at the maximum shutter speed $TV_{MAX}$ by reducing the diameter of the diaphragm 1 further beyond the aperture value $AV_P$ if such reduction is possible. As an example, under a condition of a shutter speed $TV_{MAX} = 10$ (1/1000 sec.) and a preset aperture $AV_{MAX} = 9$ (F22), control according to the line (a) in FIG. 2 provides the factors $TV_P = 10.5$ and $AV_P = 8.5$ for $EV = 19$. However, since the shutter speed is limited to $TV_{MAX} = 10$, the exposure is given by the factors $TV_P = 10$ and $AV_P = 9$.

The aperture value $AV_P$ and the shutter speed $TV_P$ given by the line (a) in FIG. 2 are represented by the equations (8) and (9). Also the shutter speeds $TV_{A0}$ and $TV_{AM}$ given by the lines (b) and (c) in FIG. 2 are represented by the equations (10) and (12). Consequently, in response to the input signals to the input ports T2, T4, the control circuit 4 calculates:

$$AV_P' = \gamma(BV + SV - TV_{Me2}) \quad (13)$$

$$TV_P' = (1-\gamma)(BV + SV - TV_{Me2}) \quad (14)$$

wherein a constant $\gamma = 1/(1+\eta)$ is generated in said control circuit 4. On the other hand the input port T3 receives a signal represented by the equation (1), which corresponds to the shutter speed $TV_{A0}$ represented by the equation (10). Also the input port T1 receives the following voltage at the junction P2:

$$T_{TVAM} = BV - AV_M + SV \quad (15).$$

As will be clear from the equation (12), the voltage at the junction P1 corresponds to the shutter speed $TV_{AM}$ providing an appropriate exposure in combination with the aperture value $AV_M$ corresponding to the smallest aperture. Also in response to the signals to the input ports T1, T2, the control circuit 4 calculates the maximum aperture value corresponding to the minimum possible aperture diameter by:

$$(BV+SV) - (BV+SV-AV_M) = AV_M \quad (16)$$

Also the control circuit 4 receives, from the contact $e_n$, or internally generates a signal indicating the maximum shutter speed $TV_{MAX}$. Thus, it calculates the maximum aperture value $AV_0$ from the signals received at the input ports T2, T3 by:

$$(BV+SV) - (BV+SV-AV_0) = AV_0 \quad (17)$$

and also calculates:

$$AV_S' = BV + SV - TV_{MAX} \quad (18)$$

from the signal received at the input port T2 and from the maximum shutter speed $TV_{MAX}$, wherein $AV_S'$ indicates an aperture value providing an appropriate exposure in combination with the maximum shutter speed $TV_{MAX}$.

Thus, under a condition $TV_P' < TV_{MAX}$, the control circuit 4 generates H-level signals from the output ports T5, T6 and an L-level signal from the output port T7 to enable the aforementioned control operations under the conditions (i) to (iii), and, under a conditions $AV_P' > AV_M$ and $TV_P' > TV_{MAX}$, it generates L-level signals from the output ports T5, T6 and an H-level signal from the output port T7. Said L-level signals from the output ports T5, T6 disable the function of the follower amplifier A4 and the comparator CP1 while the H-level signal from the output port T7 enables the function of the comparator CP2, whereby the operational amplifier A5 functions as a follower amplifier. When the diaphragm closing operation is started, the operational amplifier A5 provides an output voltage $VA5 = VA2 = (BV - AV') + SV$ the same as that of the operational amplifier A2 as shown in the equation (5) while the comparator CP2 receives an uninverted input voltage $V_{TVMen}$ representing the maximum shutter speed $TV_{MAX}$, i.e. $V_{TVMen} = TV_{MAX}$, whereby the comparator CP2 provides an H-level signal when a condition:

$$TV_{MAX} = (BV - AV') + SV \quad (19)$$

is reached, thereby energizing the magnet Mg1 and terminating the diaphragm closing operation. The aperture value thus attained corresponds to $AV_S'$ in the equation (18), so that the first memory condenser C1 stores a voltage:

$$VA2 = BV - AV_S' + SV \quad (20)$$

Consequently the shutter speed is controlled to the maximum speed $TV_{MAX}$, and thus attained is the shutter speed priority automatic exposure control mode in which the aperture value is determined according to the maximum shutter speed. The relation between the aperture value and the shutter speed in this state is represented by a line (d) in FIG. 4.

Display in the programmed automatic exposure conrol operation

The display before shutter release differs in the aforementioned modes (i) to (iv).

Figure 4:
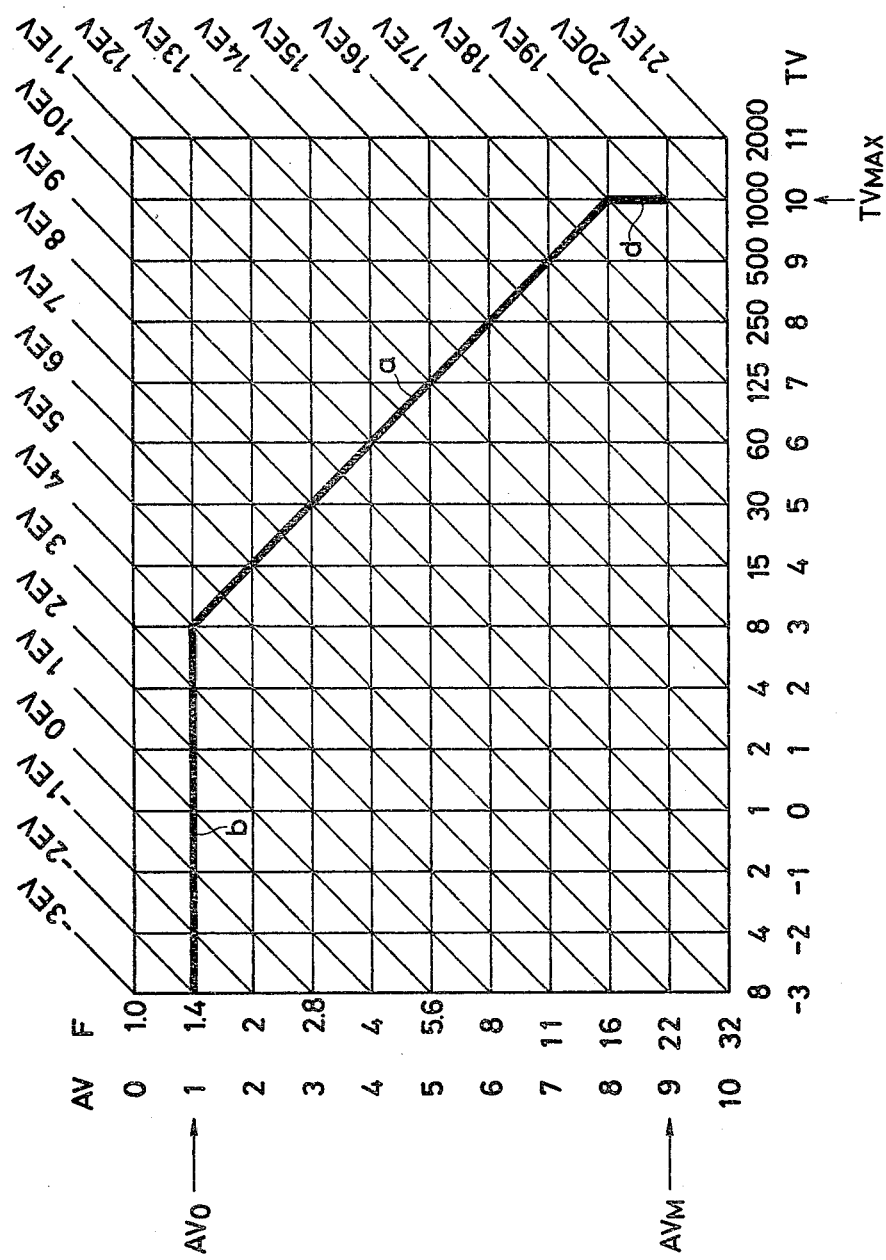

(i)′ $AV_0 < AV_P < AV_M$, $TV_P \leq TV_{MAX}$:

Under this condition, in response to the H-level signal from the input port T8, the output port T17 outputs an H-level signal to light the display unit 6, thereby displaying a character "P" indicating that the control is effected according to the programmed automatic exposure control mode and that the exposure is controlled according to the line (a) in FIG. 2 or 4. Also when the switch SW11 is open, the result of calculation by the equation (14) is transmitted to the display unit 5 to effect a digital display of the shutter speed $TV_P'$ ($=TV_P$). On the other hand, if said switch SW11 is closed, the result of calculation by the equation (13) is transmitted to the display unit 5 to indicate the aperture value $AV_P'$ ($=AV_P$).

(ii)′ $AV_P < AV_0$, $TV_P \leq TV_{MAX}$:

The H-level signal from the output port T17 lights the display unit 6. Also upon identification of $AV_P < AV_0$ from the results of calculations by the equations (13) and (17), the output port T14 outputs an output signal with alternating levels to blink the display unit 9, indicating that the exposure is controlled according to the line (b) or (c) in FIG. 2 or 4. Also according to whether the switch SW11 is open or closed, the display unit 5 respectively receives the shutter speed $TV_{PA0}$ corresponding to the input signal $BV+SV-AV_0$ to the input port T3 shown by the equation (10) or the result of calculation by the equation (17), thus displaying the shutter speed $TV_{A0}$ or the maximum aperture value $AV_0$.

(iii)′ $AV_M < AV_P$, $TV_P \leq TV_{MAX}$:

The output port T17 outputs an H-level signal to light the display unit 6. Also upon identification of $AV_M < AV_P$ from the results of calculations by the equations (13) and (16), the output port T14 outputs an output signal with alternating levels to blink the display unit 9, indicating that the exposure is controlled according to the line (b) or (c) in FIG. 2 or 4. Also according to whether the switch SW11 is open or closed, the display unit 5 receives respectively the shutter speed $TV_{PAM}$ corresponding to the input signal $BV+SV-AV_M$ to the input port T1 as represented by the equation (12) or the result of calculation by the equation (16), thus displaying the shutter speed $TV_{AM}$ or the aperture value $AV_M$.

(iv)′ $AV_M < AV_P$, $TV_P \geq TV_{MAX}$:

The output port T13 outputs an H-level signal to light the display unit 6. Also upon identification of $TV_P \geq TV_{MAX}$ from the result of calculation by the equation (14) and from the maximum shutter speed $TV_{MAX}$, the output port T15 outputs an output signal with alternating levels to blink the display unit 8, indicating that the exposure is controlled according to the line (d) in FIG. 4. Also according to whether the switch SW11 is open or closed, the display unit 5 respectively receives the maximum shutter speed $TV_{MAX}$ or the result of calculation by the equation (18), thus displaying the maximum shutter speed $TV_{MAX}$ or the aperture value $AV_S'$.

[2] Operation and display in the programmable program automatic exposure control mode In this mode the switches SW4, SW5 and SW9 are respectively connected to their contacts b, a and PP, and it is assumed that the switch SW6 is maintained open.

One of the voltages $V_{TVMe1}$-$T_{TVMen}$ arbitrarily selected from the contacts $e_1$-$e_n$ by the switch SW3 is transmitted through the switch SW4 to the junction P1. Therefore, as is clear from the equation (9), the shutter speed for EV=0 varies from $TV_{Me1}$ to $TV_{Men}$ corresponding to the shutter speed selected by the switch SW3. Thus, the line (a) in FIG. 2 causes parallel displacement as represented by lines $a_1''$-$a_n''$ in FIG. 5. It is to be noted that the inclination of said lines is corrected to $\eta' = R5/(R3+R4)$ by the opened state of the switch SW6, and the control circuit 4 performs a corresponding correction $\gamma = 1/(1+\eta')$.

The automatic exposure control operation in this mode is conducted in the same manner as in the programmed automatic exposure control mode, for the conditions (i) $AV_0 < AV_P < AV_M$, $TV_P \leq TV_{MAX}$, (ii) $AV_P < AV_0$, $TV_P \leq TV_{MAX}$, (iii) $AV_M < AV_P$, $TV_P \leq TV_{MAX}$ and (iv) $AV_M < AV_P$, $TV_P < TV_{MAX}$, wherein however the aperture value $AV_P$ and the shutter speed $TV_P$ given by the equations (7) and (9) vary according to the contact $e_1$-$e_n$ selected by the switch SW3. Also the signal to the input port T4 varies from $TV_{Me1}$ to $TV_{Men}$ according to the contact $e_1$-$e_n$ selected by said switch SW3, so that the calculations of $AV_P'$ and $TV_P'$ according to the equations (13) and (14), and the identification of $TV_P' \geq TV_{MAX}$ are effected at the same time.

Figure 5:
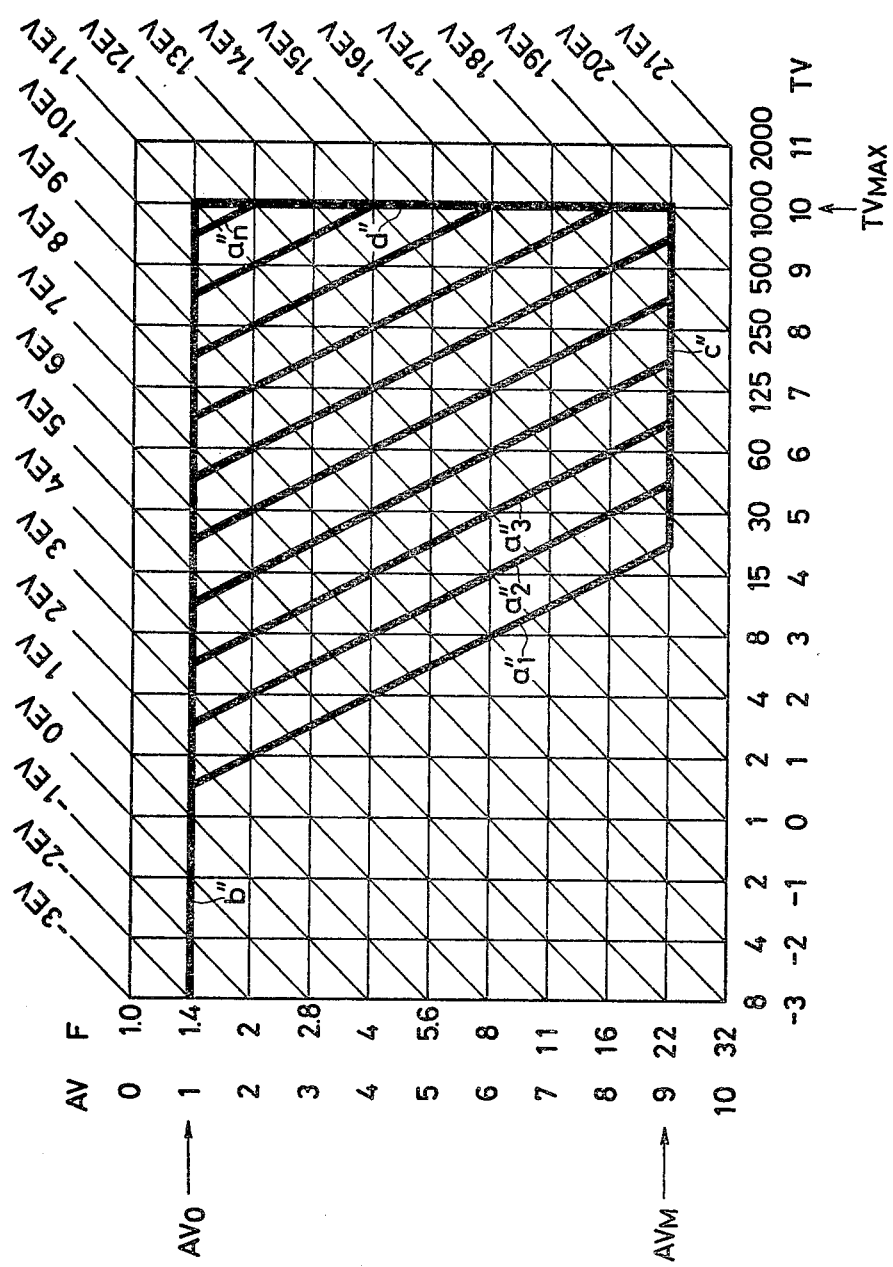

The relation between the aperture value and the shutter speed in this condition is shown in FIG. 5. As long as the aperture value satisfies a relation $AV_0 < AV_P < AV_M$ and the shutter speed satisfies a relation $TV_P \leq TV_{MAX}$, said aperture value and shutter speed are controlled along one of the lines $a_1''$-$a_n''$ according to the voltage $V_{TVMe1}$-$V_{TVMen}$ at the junction P1. Also these exposure factors are controlled along a line (b'') in case of $AV_P < AV_0$ and $TV_P \leq TV_{MAX}$ or along a line (c'') in case of $AV_M < AV_P$ and $TV_P \leq TV_{MAX}$. Also in case a relation $TV_P \geq TV_{MAX}$ is automatically reached for a condition $AV_M < AV_P$ as represented by a line $a_n''$, the control is effected with an aperture value corrected from $AV_P$ to $AV_S'$ as shown by a line (d'').

The display in the present mode is effected according to the following four cases:

(i)′ $AV_0 < AV_P < AV_M$, $TV_P \leq TV_{MAX}$:

In response to an H-level signal to the input port T9, the output port T16 outputs an H-level signal to light the display unit 7 for displaying characters "PP", indicating that the exposure is controlled according to one of the lines $(a_1'')$ to $(a_n'')$ in FIG. 5. Also, in case the switch SW11 is open, the result of calculation by the equation (14) is displayed by the display unit 5. The shutter speed in this state is represented by:

$$TV_P'(=AV_P)=(1-\gamma)(BV+SV-TV_{MeX}) \qquad (21)$$

wherein $TV_{MeX}$ is selected from $TV_{Me1}$-$TV_{Men}$, and $\gamma = 1/(1+\eta')$. In case the switch SW11 is closed, the display unit 5 shows the result of calculation by the equation (13). The aperture value in this state is represented by:

$$AV_P'(=AV_P)=\gamma(BV+SV-TV_{MeX}) \qquad (22).$$

(ii)′ $AV_P < AV_0$, $TV_P \leq TV_{MAX}$:

The output port T16 outputs an H-level signal to light the display unit 7. Also upon identification of $AV_P < AV_0$ from the results of calculations by the equations (22) and (17), the output port T14 outputs an output signal with alternating levels to blink the display unit 9, indicating that the exposure is controlled according the line (b″) or (c″) in FIG. 5. Also according to whether the switch SW11 is open or closed, the display unit 5 respectively shows the shutter speed $TV_{A0}$ represented by the equation (10) or the maximum aperture value $AV_0$ represented by the equation (17).

(iii)′ $AV_M < AV_P$, $TV_P \leq TV_{MAX}$:

The output port T16 outputs an H-level signal to light the display unit 7. Also upon identification of $AV_M < AV_P$ from the results of calculations by the equations (22) and (16), the output port T14 outputs an output signal with alternating levels to blink the display unit 9. In addition, when the switch SW11 is open or closed, the display unit 5 shows, respectively, the shutter speed $TV_{AM}$ represented by the equation (12) or the maximum aperture value $AV_M$ represented by the equation (16).

(iv)′ $AV_M < AV_P$, $TV_P \geq TV_{MAX}$:

The output port T16 outputs an H-level signal to light the display unit 7. Also upon identification of $TV_P \geq TV_{MAX}$ from the result of calculation by the equation (21) and from the maximum shutter speed $TV_{MAX}$, the output port T15 outputs an output signal with alternating levels to blink the display unit 8, indicating that the exposure is controlled according to the line (d″) in FIG. 5. Also according to whether the switch SW11 is open or closed, the display unit 5 respectively indicates the maximum shutter speed $TV_{MAX}$ or the aperture value $AV_S'$ calculated by the equation (18).

[3] Operation and display in the shutter-speed priority automatic exposure control mode In this mode the switches SW4, SW5 and SW9 are respectively connected to their contacts b, a and S. The output ports T5, T7 of the control circuit 4 output L-level signals to disable the function of the follower amplifier A4 and the comparator CP2 while the output port T6 outputs an H-level signal to enable the function of the comparator CP1. In the shutter-speed priority automatic exposure control mode, the diaphram 1 is so controlled as to attain an aperture value $AV_S$ providing an appropriate exposure in response to a manual shutter speed $TV_{Me1}$-$TV_{Men}$ selected by the switch SW3, and the control operation is effected in one of the following three cases according to the relation among $AV_0$, $AV_M$ and $AV_S$. It is assumed that the preset aperture ring of the lens is set at an aperture value $AV_M$:

(i) $AV_0 \leq AV_S \leq AV_M$:

The output voltage of the operational amplifier A5, corresponding to that of the operational amplifier A2, varies according to the equation (5) as the diaphragm closing operation is started by the shutter releasing. In said relation (5), the quantity $(BV-AV')+SV$ corresponds to the shutter speed providing an appropriate exposure for the aperture value during the diaphragm closing operation. Consequently, when a relation:

$$TV_{MeX}=BV-AV_S+SV$$

is reached, the comparator CP1 outputs an H-level signal to energize the magnet Mg1 to terminate the diaphragm closing operation at an aperture value $AV_S$. After said termination the operational amplifier A2 outputs an output signal:

$$BV+SV-AV_S=TV_{MeX}=TV_S \tag{23}$$

so that the shutter speed determining circuit controls the shutter with a manual shutter speed selected by the switch SW3.

(ii) $AV_S < AV_0$:

In this state the operational amplifier A2 outputs an output signal $BV+SV-AV_0$ before the shutter releasing operation. Consequently, under a condition $AV_S < AV_0$, the shutter speed $TV_{MeX}$ selected by the switch SW3 does not coincide with the shutter speed $TV_S$ controlled by the output voltage of the operational amplifier A2 but shows a relation:

$$TV_{MeX} < TV_S.$$

Consequently the comparator CP1 outputs an H-level signal even before the shutter releasing operation, and the magnet Mg1 is energized immediately in response to the shutter releasing operation to stop the diaphragm at an aperture value $AV_0$. Thus the shutter speed determining circuit controls the shutter with a shutter speed $TV_{SA0}$ corresponding to the output voltage:

$$AV2=TV_{SA0}=BV-AV_0+SV \tag{24}$$

of the operational amplifier A2.

(iii) $AV_S > AV_M$:

In this state the comparator CP1 does not output the H-level signal even when the diaphragm 1 is reduced to the maximum aperture value $AV_M$. The shutter speed determining circuit controls the shutter with a shutter speed $TV_{SAM}$ corresponding to the output voltage:

$$VA2=TV_{SAM}=BV-AV_M+SV \tag{25}$$

of the operational amplifier A2.

The display in the present mode is effected according to one of the following three cases:

(i) $AV_0 \leq AV_S \leq AV_M$:

In response to an H-level signal supplied to the input port T10, the output port T15 outputs an H-level signal to light the display unit 8 for displaying a character "S" indicating the shutter-speed priority automatic exposure control mode in which the aperture value is controlled under a condition $AV_0 \leq AV_S \leq AV_M$. Also the display device 5 shows the manual shutter speed $TV_{MeX}$ selected by the switch SW4 and supplied to the input port T4 or the aperture value $AV_S$ respectively when the switch SW11 is closed or opened. Since said aperture value $AV_S$ is represented by the equation (22), the control circuit 4 calculates the aperture value:

$$AV_S=BV+SV-TV_{MeX} \tag{26}$$

in response to the signals to the input ports T2, T4. Said aperture value $AV_S$ is compared with the maximum aperture value $AV_M$ and the fully opened aperture value $AV_0$ obtained from the equations (16) and (17), and, when a relation $AV_0 \leq AV_S \leq AV_M$ is identified, is transmitted to the display unit 5.

(ii) $AV_S < AV_0$:

The output port T15 outputs an H-level signal to light the display unit 8. Also the control circuit 4 identifies $AV_S < AV_0$ from the results of calculations by the equations (17) and (26), and transmits the shutter speed $TV_{SA0}$ obtained from the equation (24) or the aperture value $AV_0$ obtained from the equation (17) to the display unit 5 respectively when the switch SW11 is open or closed, thereby displaying the shutter speed $TV_{SA0}$ or the aperture value $AV_0$ in digital manner. Also upon identification of $AV_S<AV_0$, the control circuit outputs, through the output port T14, an output signal with alternating levels to blink the display unit 9.

(iii) $AV_S>AV_M$:

In this state the display unit 8 is lighted in the similar manner. The control circuit 4 identifies $AV_S>AV_M$ from the results of calculations by the equations (16) and (26) and outputs, from the output port T14, an output signal with alternating levels to blink the display unit 9 as explained in the foregoing. Also the control circuit supplies the display unit 5 with the shutter speed $TV_{SAM}$ obtained from the equation (25) or the aperture value $AV_M$ calculated from the equation (16) respectively when the switch SW11 is open or closed.

[4] Operation and display in the aperture-priority automatic exposure control mode In this mode the switch SW4 is connected to either one of its contacts a and b, while the switch SW5 is connected to its contact a, and the switch SW9 is connected to its contact A. The output ports T6, T7 of the control circuit 4 provide L-level signals to disable the function of the comparators CP1, CP2.

Since the magnet Mg1 is not energized after the releasing of the shutter because of the inactive state of the comparators CP1, CP2, the diaphragm 1 is closed to an aperture value $AV_{preset}$ determined by the preset aperture ring. Subsequently the first memory condenser C1 stores the output voltage of the operational amplifier A2, which is equal to the input signal to the input port T3:

$$AV2(=TV_{preset})=BV-AV_{preset}+SV$$

so that the shutter speed determining circuit controls the shutter with a shutter speed $TV_{preset}$.

On the other hand the control circuit 4 calculates, before the shutter releasing operation, the following preset aperture value:

$$AV_{preset}=(BV+SV)-(BV+SV-AV_{preset}) \quad (27)$$

from the signals received at the input ports T1, T2, and provides the display unit 5 with the shutter speed $TV_{preset}$ or the aperture value $AV_{preset}$ for display thereon respectively when the switch SW11 is open or closed. Also in response to the connection of the switch SW9 to the contact A, the ports T11, T14 output H-level signals to light the display unit 9 for displaying a character "A", indicating that the exposure is controlled according to the aperture priority automatic exposure control mode.

[5] Manual exposure mode

In this mode the switches SW4, SW5 are connected to their contacts b, and the switch SW9 is connected to its contact M. Also the output ports T6, T7 of the control circuit 4 output L-level signals to disable the function of the comparators CP1, CP2.

In response to the shutter releasing operation, the diaphragm 1 is closed to the aperture value $AV_{preset}$ determined by the preset aperture ring, since the magnet Mg1 is not energized by the inactive state of the comparators CP1, CP2. Subsequently the shutter speed determining circuit controls the shutter with a shutter speed $TV_{Me1}-TV_{Men}$ selected by the switch SW3.

Prior to the shutter releasing operation, the input port T12 of the control circuit is at the H-level state to output an H-level signal from the output port T13 for lighting the display unit 10, thereby displaying a character "M" representing the manual exposure mode. Also the control circuit 4 provides the display unit 5 with the input signal $TV_{preset}=BV+SV-AV_{preset}$ to the input port T1 or the input signal $TV_{Mex}=TV_{Me1}-TV_{Men}$ to the input port T4 respectively when the switch SW11 is open or closed. In fact the calculations according to the equations (27) and (16) are mutually the same since the maximum aperture value $AV_M$ is one of the preset aperture values $AV_{preset}$, but $AV_M$ and $AV_{preset}$ are separated for the clarity of the explanation.

Figure 6A:
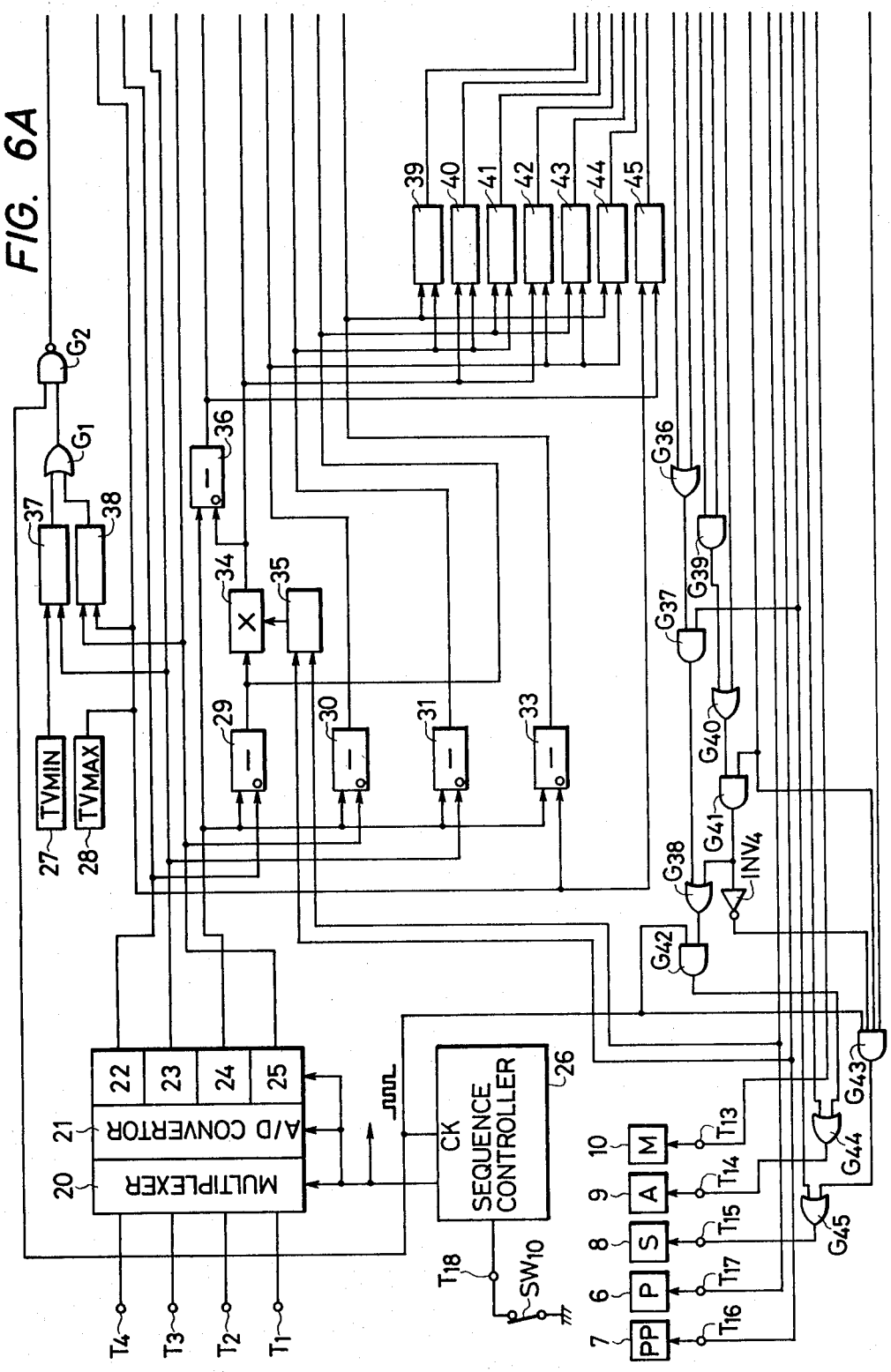
FIG. 6 comprising FIG. 6A
FIG. 6B is a detailed circuit diagram of the control circuit shown in FIG. 1.
Figure 6B:
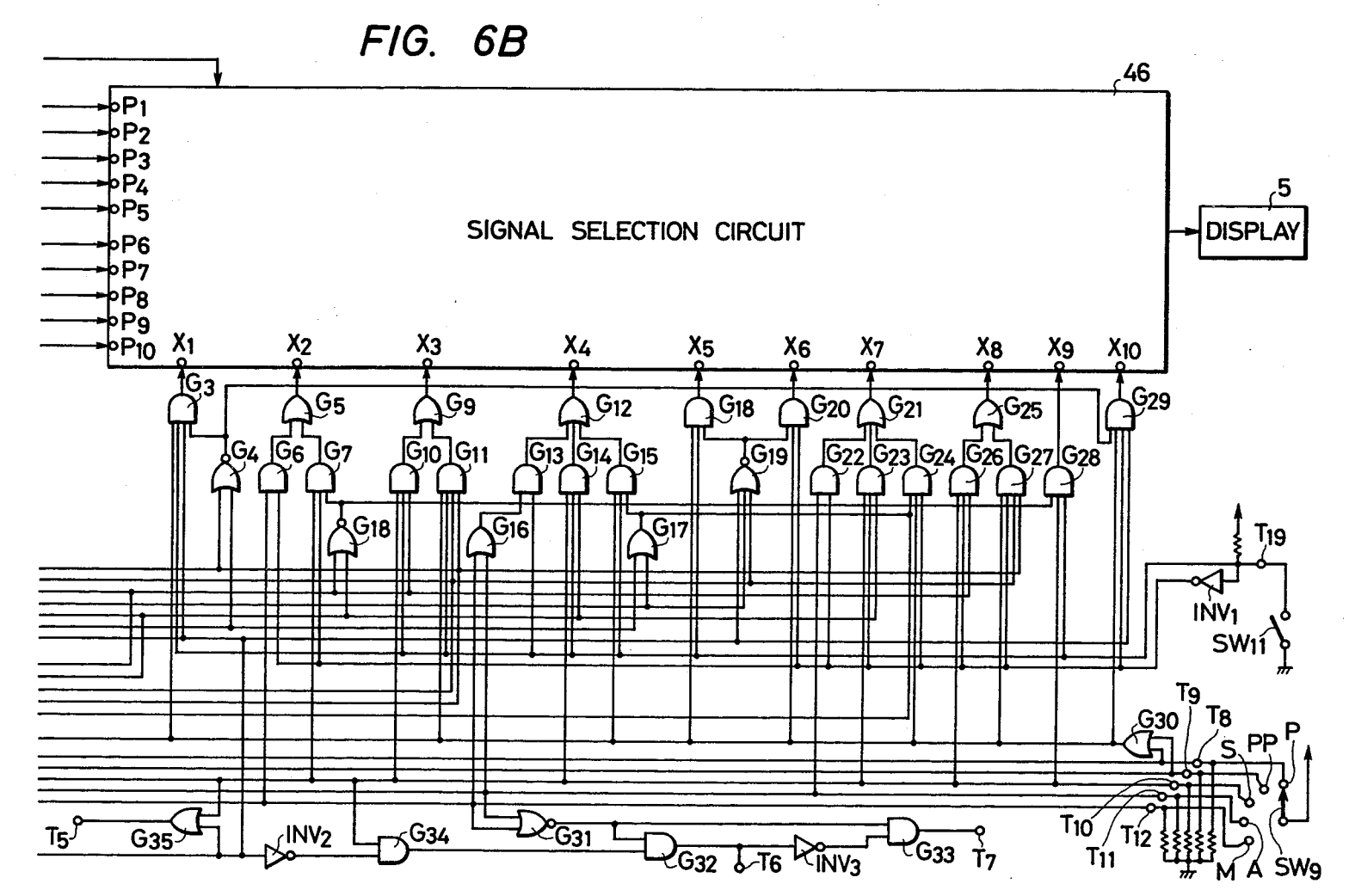

Now reference is made to FIG. 6 showing an embodiment of the control circuit 4.

In said circuit a multiplexer 20 transmits the input voltages to the ports T1-T4 to an analog-to-digital (A/D) converter 21, of which converted output signals are transmitted to digital memories 22-25 for respectively storing the digital quantities corresponding to $TV_{MeX}$, $TV_{A0}$, $EV$ and $TV_{AM}$. A sequence controller 26 controls the multiplexer 20, A/D converter 21 and memories 22-25 according to predetermined sequences and generates various clock signals and control signals. The on-off state of the latch switch SW10 is transmitted to the sequence controller 26 through the port T18 thereof. The sequence controller 26 fixes the contents of the memories 22-25 and disables the function of the A/D converter 21 when the switch SW10 is open, but activates said A/D converter 21 and refreshes said memories 22-25 when said switch SW10 is turned on.

A constant generator 27 generates a digital signal representing a limit shutter speed $TV_{MIN}$ corresponding to a longest controllable exposure time. A constant generator 28 a digital signal representing a limit shutter speed $TV_{MAX}$ corresponding to a fastest controllable shutter speed. A constant generator 35 generates a digital signal corresponding to the aforementioned constant $\gamma$. A digital subtractor 29 calculates $(BV+SV-TV_{MeX})=AV_S$ according to the output signals from the memories 22, 24. A subtractor 30 calculates $(BV+SV)-(BV+SV-AV_M)=AV_M$ from the output signals of the memories 24, 25. A subtractor 31 calculates $(BV+SV)-(BV+SV-AV_0)=AV_0$ from the output signals of the memories 23, 24. A subtractor 33 calculates $(BV+SV)-TV_{MAX}=AV_S'$ from the output signals of the memory 24 and of the second constant generator 28. A digital multiplier 34 calculates $\gamma(BV+SV-TV_{MeX})=AV_{PMeX}$ from the output signals of the subtractor 29 and of the constant generator 35. A subtractor 36 calculates $(1-\gamma)(BV+SV-TV_{MeX})=TV_{PMeX}$ from the output signals of the memory 24 and of the multiplier 34. A signal selection circuit 46 receives the output signal $TV_{MAX}$ of the constant generator 28 at an input port P1, the output signal $TV_{MeX}$ of the memory 22 at an input port P2, the output signal $TV_{A0}$ of the memory 23 at an input port P3, the output signal $TV_{AM}$ of the memory 25 at an input port P4, the output signal $TV_{PMeX}$ of the subtractor 36 at an input port P5, the output signal $AV_{PMeX}$ of the mautiplier 34 at an input port P6, the output signal $AV_M$ of the subtractor 30 at an input port P7, the output signal $AV_0$ of the subtractor 31 at an input port P8, the output signal $AV_S$ of the subtractor 29 at an input port P9, and the output signal $AV_S'$ of the subtractor 33 at an input port P10.

A comparator 39 identifies the relation $AV_S'<AV_0$ from the output signals of the subtractors 31, 33. A comparator 40 identifies the relation $AV_{PMeX} < AV_0$ from the output signals of the subtractor 31 and of the multiplier 34. A comparator 41 identifies the relation $AV_{MeX} < AV_0$ from the output signals of the subtractors 29, 31. A comparator 42 identifies the relation $AV_M < AV_{PMeX}$ from the output signals of the subtractor 30 and of the multiplier 34. A comparator 43 identifies the relation $AV_{MeX} > AV_M$ from the output signals of the subtractors 29, 30. A comparator 44 identifies the relation $AV_S' > AV_M$ from the output signals of the subtractors 30, 33. A comparator 45 identifies the relation $TV_{PMeX} > TV_{MAX}$ from the output signals of the constant generator 28 and of the subtractor 36. A comparator 37 identifies the relation $TV_{A0} < TV_{MIN}$ from the output signals of the memory 23 and the constant generator 27. A comparator 38 identifies the relation $TV_{AM} > TV_{MAX}$ from the output signals of the memory 25 and of the constant generator 28. Each of said comparators 37–45 generates an H-level or L-level signal respectively when the corresponding relation is satisfied or not.

The port T19 assumes the H-level or L-level state respectively when the switch SW11 is open or closed. Each of the ports T5–T12 assumes the H-level state when the corresponding contact P, PP, S, A or M is selected by the switch SW9 and is otherwise in the L-level state. Gates G1–G45 and inverters INV1–INV4 constitute a logic processing circuit, and ports X1–X10 of the signal selection circuit 46 respectively receive the output signals from the AND or OR gates G3, G5, G9, G12, G18, G20, G21, G25 and G29. Also the ports T5, T6 and T7 respectively receive the output signals from the NOR gate G35, AND gate G32 and AND gate G33. Furthermore, the ports T13, T14, T15, T16 and T17 respectively receive the output signals from the port T12, OR gate G44, OR gate G45, port T9 and port T8.

In the following there will be given an explanation of the function of the above-described circuit in each operation mode.

[1] Operation in the programmed automatic exposure control mode

In this mode the ports T9–T12 are at the L-level state, so that the AND gates G6, G7, G10, G13, G14, G22, G23, G26, G28 and G37 and the OR gate G5 provide L-level signals and the output signals of the comparators 41, 43 are irrelevant from the operation.

(i) $AV_0 < AV_P < AV_M$, $TV_P \leq TV_{MAX}$:

In this state the port T4 receives a signal $TV_{Me2}$ to provide an output signal $AV_{Me2} = BV + SV - TV_{Me2}$ from the subtractor 29. Consequently the multiplier 34 provides an output signal:

$$AV_{PMe2} = AV_{P'} = \gamma(BV + SV - TV_{Me2})$$

according to the equation (13), and the subtractor 36 provides an output signal:

$$TV_{PMe2} = TV_{P'} = (1-\gamma)(BV + SV - TV_{Me2})$$

according to the equation (14).

Because of the relation $AV_0 < AV_P < AV_M$, the comparators 40, 42 provide L-level signals. Also because of the relation $TV_P \leq TV_{MAX}$, the comparator 45 provides an L-level signal. Also the comparator 44 provides an L-level signal, because of the relations $AV_S' < AV_P$ and $AV_S' < AV_P \leq AV_M$ attained from the conditions $AV_0 < AV_P < AV_M$ and $TV_P \leq TV_{MAX}$. In this state the output signals of the comparator 39 and of the NOR gate G4 are not utilized. The NOR gate G35 and the port T5 provide H-level signals to activate the follower amplifier A4, and the AND gate G32 and the port T6 provide H-level signals to activate the comparator CP1. On the other hand the AND gate G33 and the port T7 provide L-level signals to deactivate the comparator CP2. Also the ports T8, T17 provide H-level signals to light the display unit 6.

When the switch SW11 is open, the H-level signal from the port T19 generates H-level output signals from the AND gate G18 and from the port X5, whereby the signal selection circuit 46 transmits the input signal $TV_{P'}$ to the port P5 to the display unit 5. On the other hand, if the switch SW11 is closed, the port T19 provides an L-level signal to generate an H-level signal from the inverter INV1, thus deriving an L-level signal from the AND gate G18 and an H-level signal from the AND gate G20, whereby the signal selection circuit 46 transmits the input signal $AV_{P'}$ of the port P6 to the display unit 5.

(ii) $AV_P < AV_0$, $TV_P \leq TV_{MAX}$:

In this state the comparator 40 generates an H-level signal while the comparators 42, 45 generate L-level signals. The NOR gate G35 and AND gate G32 provide H-level signals while the AND gate G33 provides an L-level signal to activate the follower amplifier A4 and the comparator CP1 and to deactivate the comparator CP2. The display unit 6 is lighted by the H-level signals from the ports T8, T17. Since a condition $AV_S' < AV_0$ is satisfied when $AV_P < AV_0$, the comparators 39, 40 generate H-level signals to derive an H-level signal from the OR gate G38, whereby the sequence controller 26 transmits clock pulses through the OR gates G42, G44 to the display unit 9, causing blinking operation thereof.

When the switch SW11 is open, H-level signals are outputted from the OR gate G9 and the port X3, whereby the signal selection circuit 46 transmits the input signal $TV_{A0}$ of the port P3 to the display unit 5. On the other hand when the switch SW11 is closed, the OR gate G9 outputs an L-level signal to derive an H-level signal from the output port X8 of the OR gate G25, whereby the signal selection circuit 46 transmits the input signal $AV_0$ of the port P8 to the display unit 5.

(iii) $AV_M < AV_P$, $TV_P \leq TV_{MAX}$:

The comparator 42 outputs an H-level signal because of the condition $AV_M < AV_P$, and the comparator 45 outputs an L-level signal because of the condition $TV_P \leq TV_{MAX}$. In this state the NOR gate G35 and AND gate G32 provide H-level signals while the AND gate G33 provides an L-level signal. The display unit 6 is lighted by the H-level signals from the ports T8, T17. The comparator 40 provides an L-level signal because of the condition $AV_M < AV_P$ while the comparator 42 provides an H-level signal. Also the comparator 45 provides an L-level signal because of the condition $TV_P \leq TV_{MAX}$. Consequently the OR gates G17, G40, AND gate G40 and OR gate G38 provide H-level signals whereby the sequence controller 26 transmits clock pulses through OR gates G42, G44 to the display unit 9 for causing blinking thereof. When the switch SW11 is open, the port X4 of the OR gate G12 provides an H-level signal whereby the signal selection circuit 46 transmits the input signal $TV_{AM}$ of the input port P4 to the display unit 5. On the other hand, when the switch SW11 is closed, the AND gate G24 and OR gate G21 provide H-level signals to shift the port X7 to the H-level state, whereby the signal selection circuit 46 transmits the input signal $AV_M$ of the port P7 to the display unit 5. The output signals of the comparators 39, 44 are not utilized.

(iv) $AV_M < AV_P$, $TV_P > TV_{MAX}$:

In this state the operation is effected in two ways as explained in the following. Firstly in case of $AV_S' \leq AV_M$, the comparators 39, 40, 42 and 44 provide L-level signals, while the comparator 45 provides an H-level signal because of the condition $TV_P > TV_{MAX}$. The OR gate G17 and AND gate G39 provide L-level signals to derive an L-level signal from the AND gate G41. The AND gate G43 receiving an H-level signal from the inverter INV4 transmits the clock pulses from the sequence controller 26 to the OR gate G45, thus causing blinking of the display unit 8. The display unit 6 is lighted as explained before. When the switch SW11 is open, the output port X1 of the AND gate G3 assumes an H-level state whereby the signal selection circuit 46 transmits the input signals $TV_{MAX}$ of the port P1 to the display unit 5. On the other hand, when the switch SW11 is closed, the AND gate G3 provides an L-level signal while the output port X10 of the AND gate G29 assumes an H-level state, whereby the signal selection circuit 46 transmits the input signal $AV_S'$ of the port P10 to the display unit 5.

Secondly in case of $AV_S' > AV_M$, the comparators 39, 40 provide L-level signals while the comparators 44, 45 provide H-level signals, and the output signals of the comparators 41, 42, 43 are not utilized. The H-level output signal of the comparator 44 derives H-level signals from the OR gates G7, G40, AND gate G41 and OR gate G38, thereby causing blinking of the display unit 9. The display unit 6 is lighted in the same manner as explained before, but, different from the case of $AV_s' < AV_M$, the display unit 8 is extinguished. When the switch SW11 is open, the AND gate G15 provides an H-level signal through the OR gate G12 to the port X4, whereby the signal selection circuit 46 transmits the input signal $TV_{MAX}$ of the port P4 to the display unit 5. On the other hand, when the switch SW11 is closed, the AND gate G24 provides an H-level signal through the OR gate G21 to the port X7, whereby the signal selection circuit 46 transmits the input signal $AV_M$ of the port P7 to the display unit 5.

In case of the conditions $AV_S' > AV_M$ and $TV_P > TV_{MAX}$, the comparator 38 provides an H-level signal since the output signal $TV_{AM}$ of the memory 25 is larger than $TV_{MAX}$, so that the NAND gate G2 supplies an alternating signal to the signal selection circuit in response to the clock pulses from the sequence controller 26, whereby said signal selection circuit causes blinking of the display unit 5 displaying $TV_{MAX}$ or $AV_{MAX}$. This blinking display indicates that an appropriate exposure cannot be obtained.

[2] Programmable program automatic exposure control mode

In this mode the output signal of the memory 22 varies in a range of $TV_{Me1}-TV_{Men}$ according to the selection by the switch SW3. Consequently the subtractor 29 provides an output signal $AV_{MeX} = BV + SV - TV_{MeX}$ wherein $TV_{MeX}$ represents one of $TV_{Me1}-TV_{Men}$, while the multiplier 34 provides an output signal $AV_{PMex} = AV_P' = \gamma(BV + SV - TV_{MeX})$, and the subtractor 36 provides an output signal $TV_{PMeX} = TV_P' = (1-\gamma)(BV + SV - TV_{MeX})$.

Consequently the operation in this mode is the same as that in the programmed automatic exposure control mode, except that the display unit 7 is lighted instead of the display unit 6 as the switch SW9 selects the port T9.

[3] Shutter-speed priority automatic exposure control mode

In this mode the ports T8, T9, T11, T12 are in the L-level state to derive L-level signals from the AND gates G3, G6, G11, G13, G15, G18, G20, G22, G24, G27, G29, G41 and G43 and OR gates G3 and G10, whereby the output signals from the comparators 39, 40, 42, 44 and 45 are not utilized. The display unit 8 is lighted by the H-level signal from the OR gate G45 to the port T10.

(i) $AV_0 \leq AV_S \leq AV_M$:

In this state the comparators 41, 43 provide L-level signals to derive L-level signals from the OR gates G36, G38 and AND gates G37, G42, G44, thus lighting the display unit 8 alone. When the switch SW11 is open, the H-level signal from the NOR gate G8 is transmitted through the AND gate G28 to the port X8, whereby the signal selection circuit 46 transmits the input signal $AV_S$ of the port P9 to the display unit 5. On the other hand, when the switch SW11 is closed, the H-level signal of the NOR gate G8 is transmitted through the AND gate G7 and OR gate G5 to the port X2, whereby the signal selection circuit 46 transmits the input signal $TV_{MeX}$ of the port P2 to the display unit 5.

(ii) $AV_S < AV_0$:

In this state the comparator 41 outputs an H-level signal while the comparator 43 provides an L-level signal. The H-level signals from the OR gates G36, G38 and AND gate G37 cause the sequence controller 26 to transmit the clock pulses through the AND gate G42 and OR gate G44 to the display unit 9, thus causing blinking display. When the switch SW11 is open, the H-level signal of the AND gate G10 is transmitted through the OR gate G9 to the port X3, whereby the circuit 46 transmits the input signal $TV_{A0}$ of the port P3 to the display unit 5. On the other hand, when the switch SW11 is closed, the H-level signal from the AND gate G26 is transmitted through the OR gate G25 to the port X8, whereby the circuit 46 transmits the input signal $AV_0$ of the port P8 to the display unit 5.

(iii) $AV_S > AV_M$:

In this state the comparator 41 provides an L-level signal while the comparator 43 provides an H-level signal. The display unit 9 blinks in the same manner as explained before by the H-level signals from the OR gates G36, G38 and AND gate G37. When the switch SW11 is open, the AND gate G14 transmits an H-level signal through the OR gate G12 to the port X4, whereby the circuit 46 transmits the input signal $TV_{AM}$ of the port P4 to the display unit 5. On the other hand, when the switch SW11 is closed, the AND gate G23 transmits an H-level signal through the OR gate G21 to the port X7, whereby the circuit 46 transmits the input signal $AV_M$ of the port P7 to the display unit 5.

[4] Aperture-priority automatic exposure control mode

In this mode the ports T8–T10 and T12 generate L-level signals to derive L-level signals from the AND gates G3, G6, G7, G10, G11, G14, G15, G18, G20, G23, G24, G25, G27, G28, G29, G37, G41, G42, G43 and OR gates G5, G9, G25, G30, G45, whereby the output signals of the comparators 39–45 and those of the gates G4, G8, G17, G19, G34, G35, G36, G39, G40 are not utilized in the operation. The NOR gate G13 and the AND gates G32, G33 provide L-level signals to derive L-level signals from the ports T6, T7. The port T5 may assume the H-level or L-level state. As the switch SW9 is connected to the contact A, the OR gate G44 provides an H-level signal to light the display unit 9. When the switch SW11 is open, the AND gate G13 provides an H-level signal through the OR gate G12 to the port X4, whereby the circuit 46 transmits the input signal $TV_{AM}$ of the port P4 to the display unit 5. On the other hand, when the switch SW11 is closed, the AND gate G22 provides an H-level signal through the OR gate G21 to the port X7, whereby the circuit 46 transmits the input signal $AV_M$ of the port P7 to the display unit 5. In this state there stands relation $TV_{AM} = TV_{preset} = BV - AV_{preset} + SV$.

[5] Manual exposure mode

In this mode the ports T8–T11 assume an L-level state to derive L-level signals from the AND gates G3, G7, G10, G11, G14, G15, G18, G22, G23, G24, G26, G27, G28, G29, G32, G33, G37, G41, G42, G43, OR gates G9, G21, G25, G30, G38, G44, G45 and NOR gate G31, whereby the output signals of the comparators 39–45, NOR gates G4, G8, G19, G35, AND gate G39 and OR gates G17, G34, G36, G40 are not utilized in the operation. The display unit 10 is lighted by the H-level state of the port T12. When the switch SW11 is open, the H-level signal from the OR gate G16 is transmitted through the AND gate G13 and OR gate G12 to the port X4, whereby the circuit 46 transmits the input signal $TV_{AM} = TV_{preset}$ to the display unit 5.

On the other hand, when the switch SW11 is closed, the H-level signal of the AND gate G6 is transmitted through the OR gate G5 to the port X2, whereby the circuit 46 transmits the input signal $TV_{MeX} = TV_{Me1} - TV_{Men}$ of the port T2. An appropriate exposure is obtained if $TV_{MeX} = TV_{preset}$.

The comparator 37 compares the output signal $TV_{A0}$ of the memory 23 with the output signal $TV_{MIN}$ of the constant generator, and, if $TV_{A0} > TV_{MIN}$, supplies an alternating signal to the circuit 46 through the NOR gate G2, thus blinking the display unit 5. Similarly the comparator 38 causes the blinking display of the unit 5 in case of $TV_{AM} > TV_{MAX}$. The switch SW11 may be so constructed as to be actuated by the shutter releasing button or by a setting lever of the self-timer.

Figure 7:
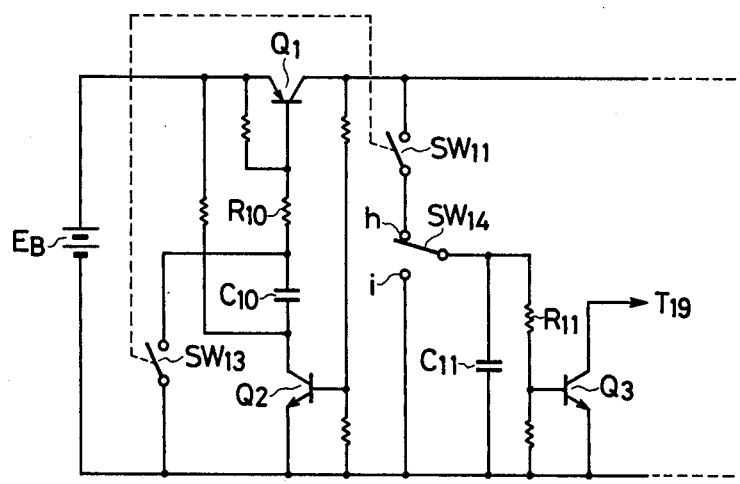
FIG. 7 is a circuit diagram showing another embodiment of the present invention.

FIG. 7 shows an embodiment in which the display selecting switch SW11 shown in FIGS. 1 and 6 is linked with the shutter releasing button.

In the circuit shown in FIG. 7, the power supply from a power source $E_B$ to the circuits shown in FIGS. 1 and 6 is conducted through a power supply timer circuit composed of transistors Q1, Q2, a resistor R10 and a condenser C10. A power switch SW13 is linked with a shutter releasing button (not shown) of the camera, to which the display selecting switch SW11 is also linked. When the shutter releasing button is lightly depressed for a first stroke the power switch SW13 is closed but the switch SW11 remains open. When said shutter button is further depressed for a second stroke, both switches SW13, SW11 are closed. A final stroke of the depression of said button triggers a shutter releasing mechanism (not shown) of the camera to initiate the exposure control thereof, while said switches SW13, SW11 remain closed. A switch SW14 is connected either to a contact h or i substantially simultaneously with the closing or opening of the latch switch SW10 shown in FIGS. 1 and 6. A display selecting timer circuit is composed of a condenser C11, a resistor R11 and a transistor Q3, of which collector is connected to the port T19 shown in FIGS. 1 and 6. In said first stroke of the shutter releasing button, the transistor Q3 is turned off to provide a display the same as when the display selecting switch SW11 shown in FIG. 6 is open. In said second stroke of the shutter releasing button, the transistor Q3 is turned on to provide a display the same as when said switch SW11 is closed, and the transistor Q3 is maintained turned on for a period determined by the condenser C11 and the resistor R11, generally in the order of 1 to 3 seconds, even when the shutter releasing button is returned to a position in said first stroke or to a state before depression. Upon initiation of the exposure control by the complete depression of the shutter releasing button, the switch SW14 is changed over to the contact i, whereby the condenser C11 is discharged to turn off the transistor Q3 even if the switch SW11 is closed. Consequently the digital display reaches a state when said switch SW11 is opened. Upon completion of the exposure control operation, the switch SW14 returns to the contact h, whereupon the display is controlled by the state of the switch SW11.

I claim:

1. A display device for visually displaying an exposure time value and a diaphragm aperture value and adapted for use in a camera in which at least one of said values is automatically controlled in response to the luminance of an object for providing an appropriate exposure, comprising:
    (a) means for generating a first signal representing one of said exposure time value and said diaphragm aperture value;
    (b) means for generating a second signal representing the other of said values;
    (c) display means normally driven in response to said first signal to display the value represented thereby; and
    (d) manually actuated means for causing said display means to be driven by said second signal, instead of said first signal.

2. A display device according to claim 1, wherein the value represented by said first signal is automatically controlled in response to the luminance of said object.

3. A display device according to claim 2, wherein said camera includes means for presetting said exposure time value, means responsive to the preset exposure time value for automatically controlling said diaphragm aperture, and means for modifying said exposure time value when said diaphragm aperture has reached a limit value, and means for causing said first signal to represent said diaphragm aperture value until said diaphragm aperture value reaches said limit value and to represent said exposure time value when said diaphragm aperture value has reached said limit value.

4. A camera comprising:
    (a) exposure determination means operable in any one of first, second, and third exposure modes, the first mode automatically determining both of an exposure time value and a diaphragm aperture value under a predetermined program, the second mode automatically determining the diaphragm aperture value on the basis of a preset exposure time value, and the third mode automatically determining the exposure time value on the basis of a preset diaphragm aperture value;

(b) mode selection means for selecting one of said exposure determination modes;

(c) first, second, and third display units associated with said first, second, and third modes, respectively;

(d) first drive means for driving the display unit associated with the mode selected by said mode selection means;

(e) first detector means for detecting that said determined exposure time value exceeds a limit value;

(f) second detector means for detecting the said determined diaphragm aperture value exceeds a limit value; and (g) second drive means for driving said second display unit in response to said detecting by said first detector means and for driving said third display unit in response to said detecting by said second detector means.

5. A camera according to claim 4, further comprising means adapted, in response to said detecting by said first detector means, to correct said determined diaphragm aperture value to an aperture value providing an appropriate exposure with respect to an exposure time value at its said limit value, and means adapted, in response to said detection by said second detector means, to correct said determined exposure time value to an exposure time value providing an appropriate exposure with respect to an aperture value at its said limit value.

6. A camera comprising:

(a) exposure determination means operable in either of first and second modes, the first mode automatically determining a diaphragm aperture value on the basis of a preset exposure time value and the second mode automatically determining an exposure time value on the basis of a preset diaphragm aperture value;

(b) mode selection means for selecting one of said exposure determination modes;

(c) first and second display units corresponding to said first and second modes, respectively;

(d) first drive means for driving the display unit corresponding to the mode selected by said mode selection means;

(e) first detector means for detecting that said determined exposure time value exceeds a limit value;

(f) second detector means for detecting that said determined diaphragm aperture value exceeds a limit value; and (g) second drive means for driving said first display unit in response to said detecting by said first detector means and for driving said second display unit in response to said detecting by said second detector means.

7. A camera comprising:

(a) shutter speed setting means including a switch operable to a plurality of positions to provide a corresponding plurality of preset exposure time values;

(b) means for producing a plurality of outputs with different levels corresponding to said plurality of positions, respectively;

(c) means for determining a combination of exposure time value and diaphragm value in accordance with a predetermined program to provide an appropriate exposure dependent upon the luminance of an object; and (d) means for selecting the predetermined program in accordance with the outputs at said plurality of positions, respectively.

* * * * *